US012467189B2

(12) United States Patent
Kim et al.

(10) Patent No.: US 12,467,189 B2
(45) Date of Patent: Nov. 11, 2025

(54) WASHING MACHINE AND CLOTHES TREATING APPARATUS

(71) Applicant: SAMSUNG ELECTRONICS CO., LTD., Suwon-si (KR)

(72) Inventors: Seungoh Kim, Suwon-si (KR); Jihye Lee, Suwon-si (KR); Yongbin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 17/954,031

(22) Filed: Sep. 27, 2022

(65) Prior Publication Data
US 2023/0183910 A1 Jun. 15, 2023

Related U.S. Application Data

(63) Continuation of application No. PCT/KR2022/012629, filed on Aug. 24, 2022.

(30) Foreign Application Priority Data

Dec. 15, 2021 (KR) .................. 10-2021-0179281

(51) Int. Cl.
*D06F 37/30* (2020.01)
*D06F 37/36* (2006.01)
*F16H 1/28* (2006.01)
*F16H 57/029* (2012.01)

(52) U.S. Cl.
CPC ............ *D06F 37/304* (2013.01); *D06F 37/36* (2013.01); *F16H 1/28* (2013.01); *F16H 57/029* (2013.01)

(58) Field of Classification Search
CPC .................................................. D06F 37/304
See application file for complete search history.

(56) References Cited

U.S. PATENT DOCUMENTS

| 9,121,127 B2 | 9/2015 | Ponnaganti et al. |
| 11,365,504 B2 | 6/2022 | Sonoda et al. |
| 2006/0010612 A1 | 1/2006 | Kim et al. |
| 2020/0232143 A1* | 7/2020 | Sonoda .................. D06F 33/00 |

FOREIGN PATENT DOCUMENTS

| CN | 106757995 A | 5/2017 |
| CN | 208562866 U | 3/2019 |
| JP | 2010-240006 | 10/2010 |

(Continued)

OTHER PUBLICATIONS

International Search Report dated Dec. 16, 2022 issued in PCT Application No. PCT/KR2022/012629.

(Continued)

*Primary Examiner* — Jason Y Ko
(74) *Attorney, Agent, or Firm* — STAAS & HALSEY LLP

(57) ABSTRACT

A washing machine including a main body, a tub, a drum, and a driving device. The driving device includes a drum shaft, a motor, and a planetary gear assembly. The planetary gear assembly includes a sun gear connected to a rotor, a carrier connected to the drum shaft, a planetary gear to transmit a rotary power of the sun gear to the carrier, an internal gear engaged with the planetary gear, and a sealing member configured to seal a gap between the carrier and the internal gear.

20 Claims, 17 Drawing Sheets

(56) References Cited

FOREIGN PATENT DOCUMENTS

| | | |
|---|---|---|
| JP | 4923950 B2 | 4/2012 |
| JP | 2020-124381 | 8/2020 |
| KR | 10-2007-0037047 | 4/2007 |
| KR | 10-0903147 | 6/2009 |
| KR | 10-0934000 B1 | 12/2009 |
| KR | 10-1176138 | 8/2012 |
| KR | 10-1639022 B1 | 7/2016 |
| KR | 10-2020-008960 A | 7/2020 |
| KR | 10-2020-0089604 | 7/2020 |

OTHER PUBLICATIONS

Written Opinion Report dated Dec. 16, 2022 issued in PCT Application No. PCT/KR2022/012629.
Office Action dated Nov. 14, 2024 issued in European Application No. EP 22 90 7612.

\* cited by examiner

WASHING MACHINE AND CLOTHES TREATING APPARATUS

CROSS-REFERENCE TO RELATED APPLICATION(S)

This application a continuation application, under 35 U.S.C. § 111(a), of International Application No. PCT/KR2022/012629, filed Aug. 24, 2022, which is based on claims priority under 35 U.S.C. § 119 to Korean Patent Application No. 10-2021-0179281, filed on Dec. 15, 2021 in the Korean Intellectual Property Office, the disclosure of which is incorporated by reference herein in its entirety.

BACKGROUND

1. Field

The disclosure relates to a washing machine and a clothes treating apparatus having a driving device for driving a drum, and more specifically, to a washing machine and a clothes treating apparatus having an improved structure of a driving device for driving a drum.

2. Description of Related Art

Currently, various types of washing machines have been developed and put on the market. Washing machines may be divided into a vertical washing machine in which a rotary tub accommodating laundry rotates approximately around a vertical axis direction, and a drum type washing machine in which a rotary tub accommodating laundry rotates approximately around a horizontal axis or an inclined axis. In recent years, the drum type washing machines have become the majority. Such washing machines are driven by a motor.

In the case of a drum type washing machine, a series of washing processes, such as washing, rinsing, and spin-drying, are performed by rotating a drum accommodating laundry. A washing or rinsing process of rotating laundry containing a large amount of water requires a high torque rotary power at a low speed. A spin-drying process of rotating laundry to remove moisture from the laundry requires a low torque rotary power at a high speed.

Accordingly, the motor for driving the washing machine needs to respond to the rotary power. To this end, a speed reducer and a clutch are generally used. For example, a pulley and a belt may be provided between a motor and an output shaft, or a plurality of gears, such as a planetary gear mechanism and the like, may be provided to enable deceleration. In addition, by providing a clutch, the driving state may be switched.

Unlike the above described types of washing machines (an indirect drive type) in which a driving object is indirectly driven using a motor, there is another types of washing machines (a direct drive type) in which a driving object is directly driven using a motor. In such washing machines, inverter control is performed instead of using a speed reducer and a clutch.

SUMMARY

According to an aspect of the disclosure, there is provided a washing machine including: a main body; a tub inside the main body; a drum inside the tub; and a driving device configured to rotate the drum, wherein the driving device includes: a drum shaft connected to the drum; a motor including a stator and a rotor rotatable through interaction with the stator; and a planetary gear assembly connecting the rotor to the drum shaft to rotate the drum shaft, wherein the planetary gear assembly includes: a sun gear connected to the rotor; a carrier connected to the drum shaft; a planetary gear to transmit a rotary power of the sun gear to the carrier; an internal gear engaged with the planetary gear; and a sealing member configured to seal a gap between the carrier and the internal gear.

The planetary gear assembly may include: a sealed space formed in which the planetary gear is located and to be filled with a lubricating oil therein.

The sealing member may include: a sealing body; and a sealing cover made of a material more flexible than a material made of the sealing body and formed to surround the sealing body.

The sealing member may further include an elastic body to apply an elastic force toward the carrier.

The sealing cover may be formed to cover a portion of the elastic body that faces the carrier.

The sealing body may be located closer to the internal gear than the elastic body is to the internal gear.

The planetary gear may be to have one side covered by the carrier and an other side, opposite to the one side, covered by the internal gear.

The planetary gear assembly may further include a planetary gear shaft rotatably coupled to the one side of the planetary gear and fixed to the carrier.

The internal gear may have a gear portion engaged with the planetary gear and a cover portion covering the other side of the planetary gear.

The planetary gear assembly may further include: a bush bearing and a sliding member, both the bush bearing and the sliding member are located between the sun gear and the internal gear; and a carrier bearing between the sun gear and the carrier.

The internal gear, the sealing member, the carrier, the carrier bearing, the sun gear, the bush bearing, and the sliding member may form a closed loop in a cross section of the planetary gear assembly taken along a direction of a rotation axis of the planetary gear.

The sun gear may be fixed to the rotor by a fastening member.

The rotor may include a rotor case and a plurality of magnets, and the plurality of magnets are facing an outer periphery of the stator.

The driving device may be mounted on the tub to form a gap between the driving device and the tub.

According to another aspect of the disclosure, there is provided a clothes treating apparatus including: a main body; a drum inside the main body; and a driving device configured to rotate the drum, wherein the driving device includes: a drum shaft connected to the drum; a motor including a stator and a rotor rotatable through interaction with the stator; and a planetary gear assembly connecting the rotor to the drum shaft to rotate the drum shaft, wherein the planetary gear assembly includes: a sun gear connected to the rotor; a carrier connected to the drum shaft; a planetary gear to transmit a rotary power of the sun gear to the carrier; and an internal gear engaged with the planetary gear, and wherein the planetary gear assembly has a space, formed therein, in which the planetary gear is located, sealed and to be filled with a lubricating oil.

The planetary gear assembly may include a sealing member configured to seal a gap between the internal gear and the carrier to seal the space in which the planetary gears are located.

The sealing member may include a sealing body, a sealing cover formed of a material more flexible than a material formed of the sealing body and configured to surround the sealing body, and an elastic body to apply an elastic force toward the carrier.

The sealing cover may be formed to cover a portion of the elastic body facing the carrier, and the sealing body may be located closer to the internal gear than the elastic body is to the internal gear.

The planetary gear assembly may include a planetary gear shaft rotatably coupled to one side of the planetary gear and fixed to the carrier.

The internal gear may include a gear portion engaged with the planetary gear, and a cover portion covering an other side opposite to the one side of the planetary gear.

DETAILED DESCRIPTION

Figure 1:
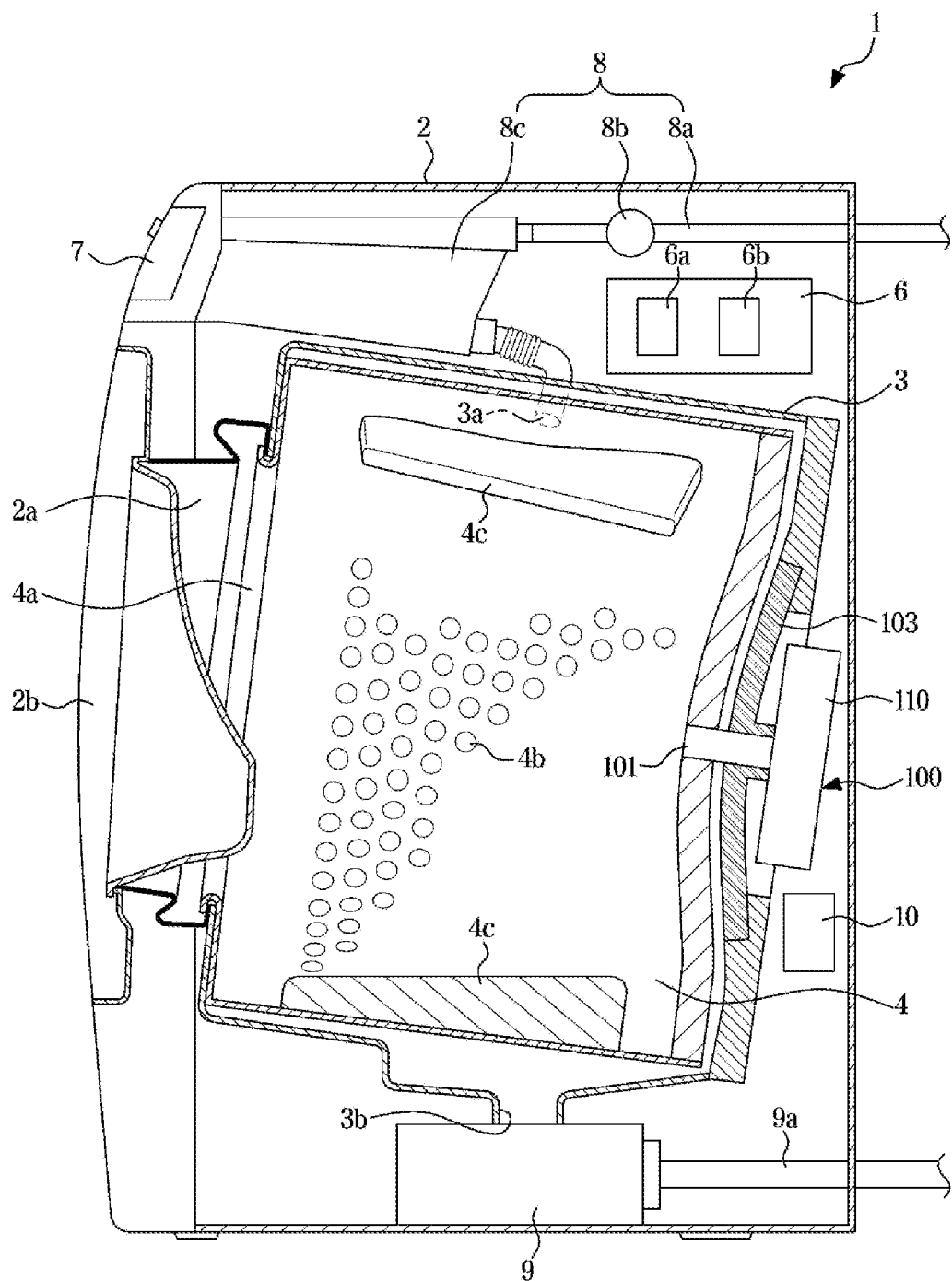
FIG. 1 is a cross-section illustrating a washing machine according to an embodiment of the disclosure.

Embodiments and features as described and illustrated in the disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

Hereinafter, embodiments of the disclosed technology will be described in detail with reference to the drawings. The following description is only an example, and does not limit the disclosure, application, or its use. Also, for the sake of convenience of description, directions, such as a upward direction and a downward direction, may be used with reference to the drawings. In addition, with respect to a rotation axis, the direction in which the rotation axis extends rotation axis may be referred to as a "rotation axis direction", a circumferential direction about the rotation axis may be referred to as a "circumferential direction", and a diameter or radial direction with respect to the rotation axis may also be referred to as a "diameter direction".

Hereinafter, an embodiment in which a driving device is applied to a washing machine will be described, but the driving device is also applicable to a clothes treating apparatus.

One aspect of the disclosure provides a washing machine and a clothes treating apparatus that are capable of including a driving device having a reduced size.

Another aspect of the disclosure provides a washing machine and a clothes treating apparatus that are capable of including a driving device having reduced noise.

Another aspect of the disclosure provides a washing machine and a clothes treating apparatus that are capable of including a driving device having an improved durability.

According to the aspect of the disclosure, the washing machine and the clothes treating apparatus have an internal gear provided to cover a portion of a planetary gear so that the number of parts can be reduced, thus providing the driving device with a reduced size.

According to the aspect of the disclosure, the washing machine and the laundry treatment apparatus have a space, in which a planetary gear is located, filled with lubricating oil while being sealed by a sealing member, so that noise caused by frictional force can be reduced.

According to the aspect of the disclosure, the washing machine and the laundry treatment apparatus has a space, in which a planetary gear is located, filled with lubricating oil while being sealed by a sealing member, so that the durability can be improved.

Figure 2:
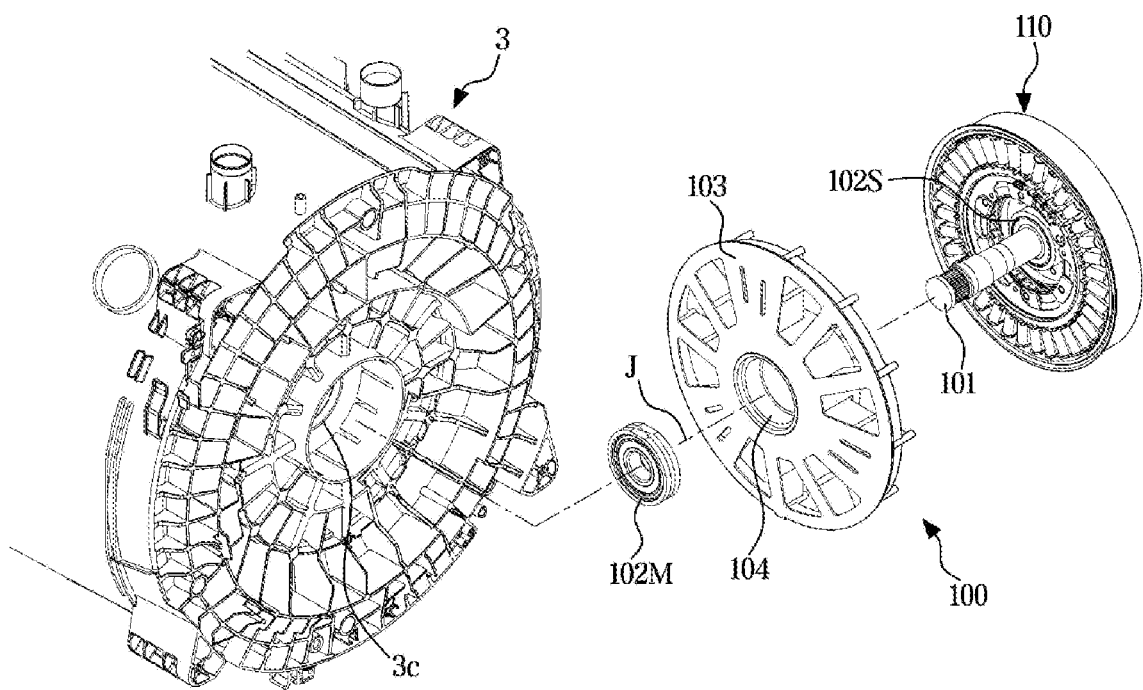
FIG. 2 is an exploded view illustrating a tub and a driving device shown in FIG. 1.

FIG. 1 is a cross-section illustrating a washing machine according to an embodiment of the disclosure. FIG. 2 is an exploded view illustrating a tub and a driving device shown in FIG. 1.

Referring to FIG. 1, a washing machine 1 may be a drum type washing machine. The washing machine 1 is configured to automatically perform a series of washing processes including washing, rinsing, and spin-drying.

The washing machine 1 may include a main body 2, a tub 3, a drum 4, a driving device 100, and a controller 6.

The main body 2 is a box-shaped container composed of a panel or a frame, and constitutes the outer portion of the washing machine 1. A circular inlet 2a is formed on the front of the main body 2 to put in or take out laundry therethrough. The inlet 2a is provided with a door 2b having a transparent window. The inlet 2a is opened and closed by the door 2b. In the main body 2, a manipulation part 7 having a switch and the like manipulated by a user is provided on the upper side of e the inlet 2a.

The main body 2 is provided at an inside thereof with a tub 3 that communicate with the inlet 2a. The tub 3 includes a cylindrical container having a bottom and provided to store water therein, and has an opening connected to the inlet 2a. The tub 3 is supported by a damper (not shown) provided inside the main body 2 to be stabilized with a center line J thereof slightly inclined to a front upper side.

On the upper side of the tub 3, a water supply device 8 including a water supply pipe 8a, a water supply valve 8b, and a detergent input device 8c is provided. Although not shown in FIG. 1, an upstream end of the water supply pipe 8a may protrude to the outside of the washing machine 1 to be connected to an external water supply source. A downstream end of the water supply pipe 8a may be connected to a water supply port 3a formed by an upper portion of the tub 3 that is provided to be open. The water supply valve 8b and the detergent input device 8c are sequentially installed in the middle of the water supply pipe 8a from the upstream side of the water supply pipe 8a.

The detergent input device 8c receives detergent, mixes the received detergent with water to be supplied, and inputs the detergent mixed water into the tub 3. On the lower side of the tub 3, a drain port 3b is provided. The drain port 3b is connected to a drain pump 9. The drain pump 9 may discharge undesired water stored in the tub 3 to the outside of the washing machine 1 through the drain pipe 9a.

The drum 4 includes a cylindrical container having a diameter slightly smaller than that of the tub 3, and is accommodated in the tub 3 such that a center line J thereof is aligned with that of the tub 3. A circular opening 4a corresponding to the inlet 2a is formed in a front portion of the drum 4. Laundry may be put into the drum 4 through the inlet 2a and the circular opening 4a.

The drum 4 is provided with a number of spin-drying holes 4b at the entire circumference (only a part of the entire circumference is shown in FIG. 1) of a side portion thereof. In addition, lifters 4c for stirring are provided at a plurality of positions on an inner area of the side portion. A front portion of the drum 4 is supported on the inlet 2a in a rotatable state.

The driving device 100 may be installed at a rear side of the tub 3. As specifically shown in FIG. 2, the driving device 100 includes a drum shaft 101, a base 103, a motor 110, and the like. The drum shaft 101 passes through a rear portion 3c of the tub 3 and protrudes into the tub 3. One end of the drum shaft 101 is fixed at approximately the center of the rear portion of the drum 4.

That is, the rear portion of the drum 4 is axially supported by the drum shaft 101, and the driving device 100 directly drives the drum 4 (so-called, corresponding to a direct drive method). Accordingly, the drum 4 rotates with respect to the center line J based on driving of the motor 110.

The center line J may correspond to a rotation axis (a rotation axis J). Since the washing machine 1 is a drum type washing machine, the rotation axis J is arranged to extend in a direction inclined with respect to the horizontal direction or in a substantially horizontal direction.

The controller 6 may include hardware, such as a central processing unit (CPU) and a memory, and software, such as a control program and various types of data. The controller 6 may include at least one processor. The processor may be configured to execute program instructions residing in a memory.

The controller 6 is installed on the upper portion of the main body 2. The controller 6 controls the overall operation of the washing machine 1. The controller 6 includes a motor controller 6a and a clutch controller 6b. The motor controller 6a may control driving of the motor 110. The clutch controller 6b may control driving of the clutch 130.

The main body 2 has an inverter 10 installed therein to receive power from an external power source. The inverter 10 is electrically connected to the controller 6 and the driving device 100. As the controller 6 controls the inverter 10, the driving device 100 is driven. Accordingly, the drum 4 rotates.

Figure 3:
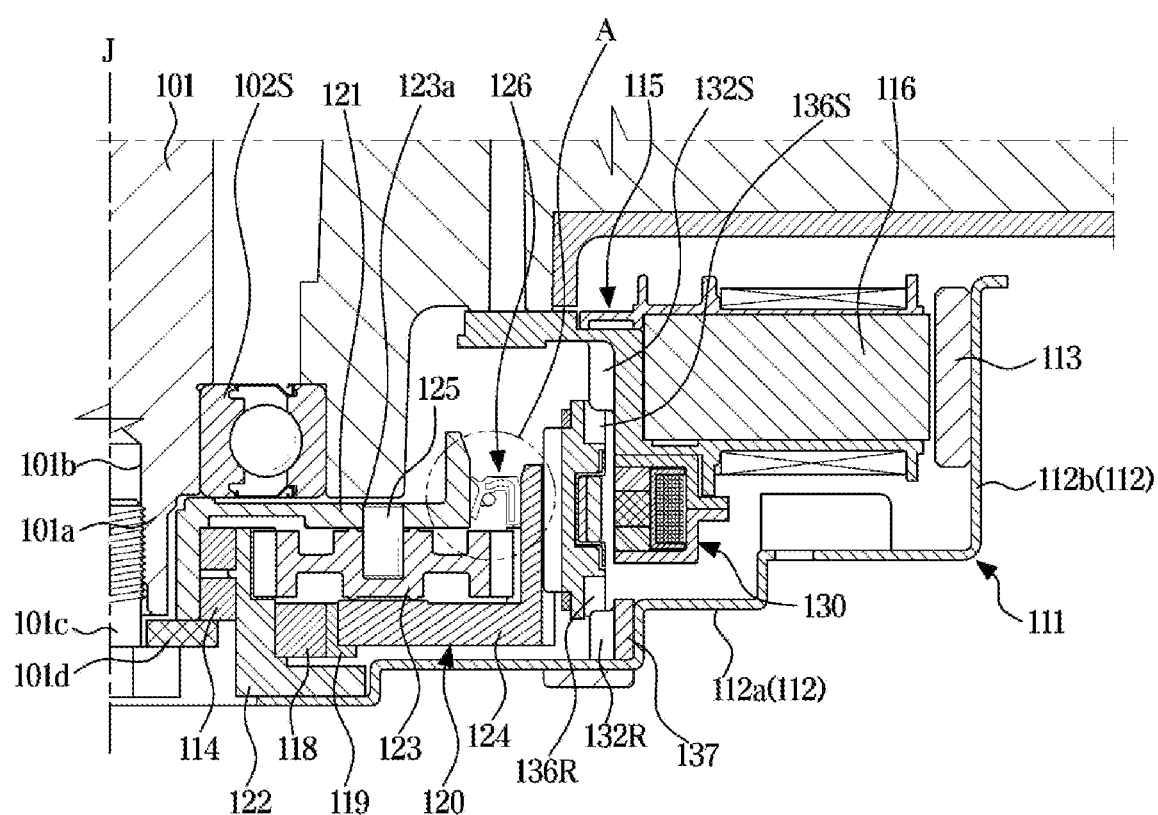
FIG. 3 is a schematic cross-section illustrating the driving device shown in FIG. 2.

FIG. 3 is a schematic cross-section illustrating the driving device shown in FIG. 2.

Referring to FIGS. 2 and 3, the driving device 100 may include a drum shaft 101, a base 103, and a motor 110.

The base 103 includes a substantially disk-shaped metal or resin member installed at the bottom of the tub 3. The base 103 is provided at the center thereof with a shaft insertion hole 104 formed in a cylindrical shape and extending along the center line J. A pair of bearings (a main bearing 102M and a sub bearing 102S) are mounted at both ends of the shaft insertion hole 104. In FIG. 2, the drum shaft 101 and the sub bearing 102S are illustrated as being assembled to the motor 110. The motor 110 is mounted on the rear side of the base 103.

The drum shaft 101 includes a metal member provided in a cylindrical shape and having a diameter smaller than that of the shaft insertion hole 104. The drum shaft 101 is inserted into the shaft insertion hole 104 with one end thereof protruding from the shaft insertion hole 104. The drum shaft 101 is supported on the base 103 through the pair of bearings 102M and 102S. Accordingly, the drum shaft 101 is provided to be rotatable about the rotation axis J.

The motor 110 has been studied on the structure suitable for driving the washing machine 1. That is, in the washing machine 1, washing, rinsing, and spin-drying processes are individually performed, and for this, the motor 110 is required to have a high torque output at a low speed rotation and a low torque at a high speed rotation.

In general, a method of indirectly rotating the drum by interposing a speed reducer and a clutch between the drum and the motor (an indirect drive method), or a method of directly rotating the drum based on driving under inverter control (a direct drive method) are used.

In this regard, the driving device 100 according to the disclosure has been studied to efficiently combine the indirect drive method and the direct drive method to resolve limitations of the respective methods. That is, the washing machine 1 according to the disclosure is implemented to have a compact size while having a large washing capacity and low noise, and realizing energy saving.

Specifically, the speed reducer 120 and the clutch 130 provided between the drum shaft 101 and the motor 110 are efficiently integrated into the motor 110 for rotating a single drum shaft 101, which is an output shaft, forming a unitary structure. Accordingly, the motor 110, the speed reducer 120, and the clutch 130 are aligned in a direction H substantially perpendicular to the rotation axis J. Hereinafter, the structure will be described in detail. Since the speed reducer 120 is provided as a planetary gear device, the structure may be considered as a planetary gear assembly 120.

The drum shaft 101 has a rear end 101*a* protruding from the sub bearing 102S. The rear end 101*a* of the drum shaft 101 has a screw hole 101*b* extending along the center line J. The rear end 101*a* of the drum shaft 101 is provided at an outer peripheral surface thereof with a serration extending along the center line J. A retainer 101*d* is provided in the screw hole 101*b*, and fastened with a bolt 101*c*. With such a configuration, a carrier 121 to be described below may be fixed to the rear end 101*a* of the drum shaft 101.

Figure 4:
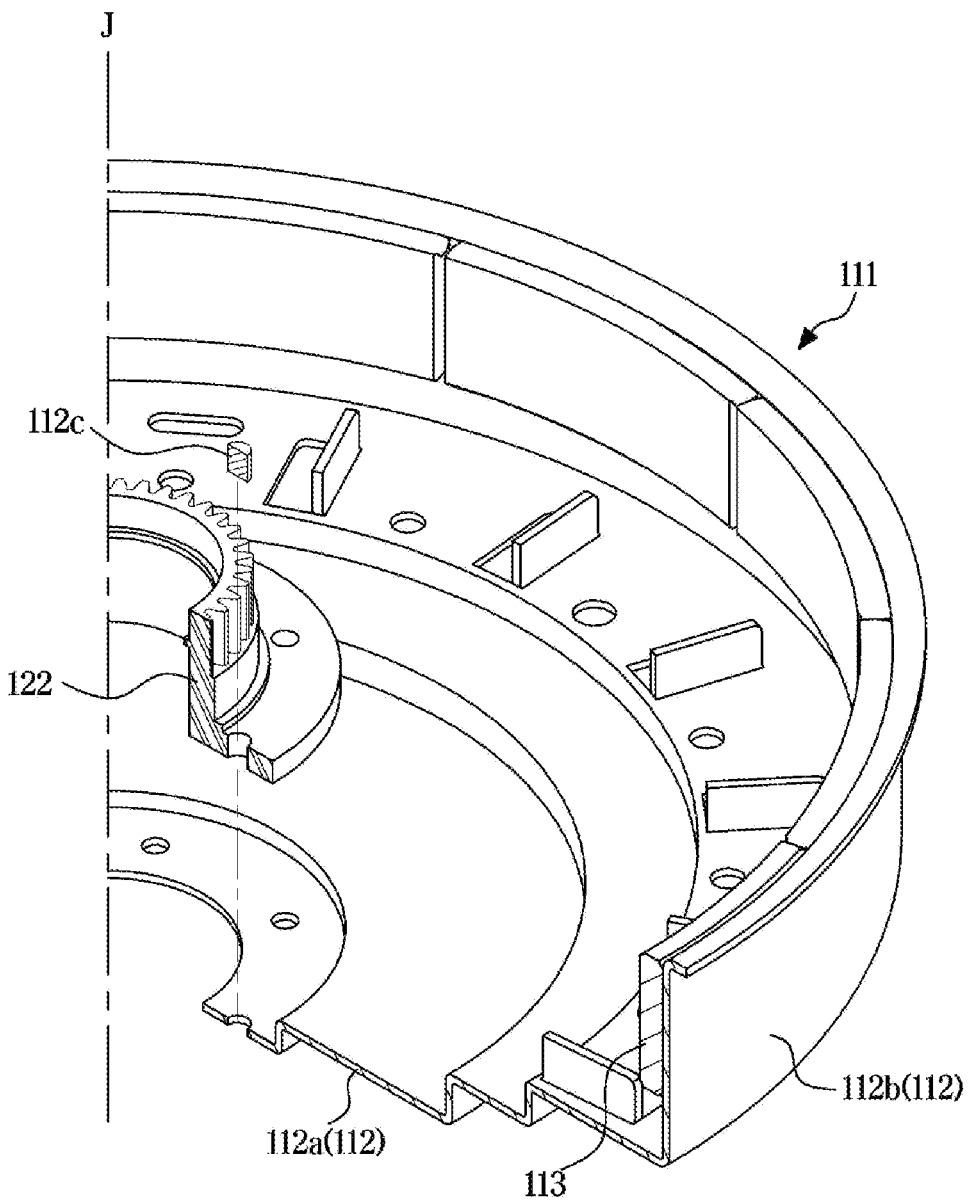
FIG. 4 is a schematic view partially illustrating a drum shaft and a rotor shown in FIG. 3.
Figure 5:
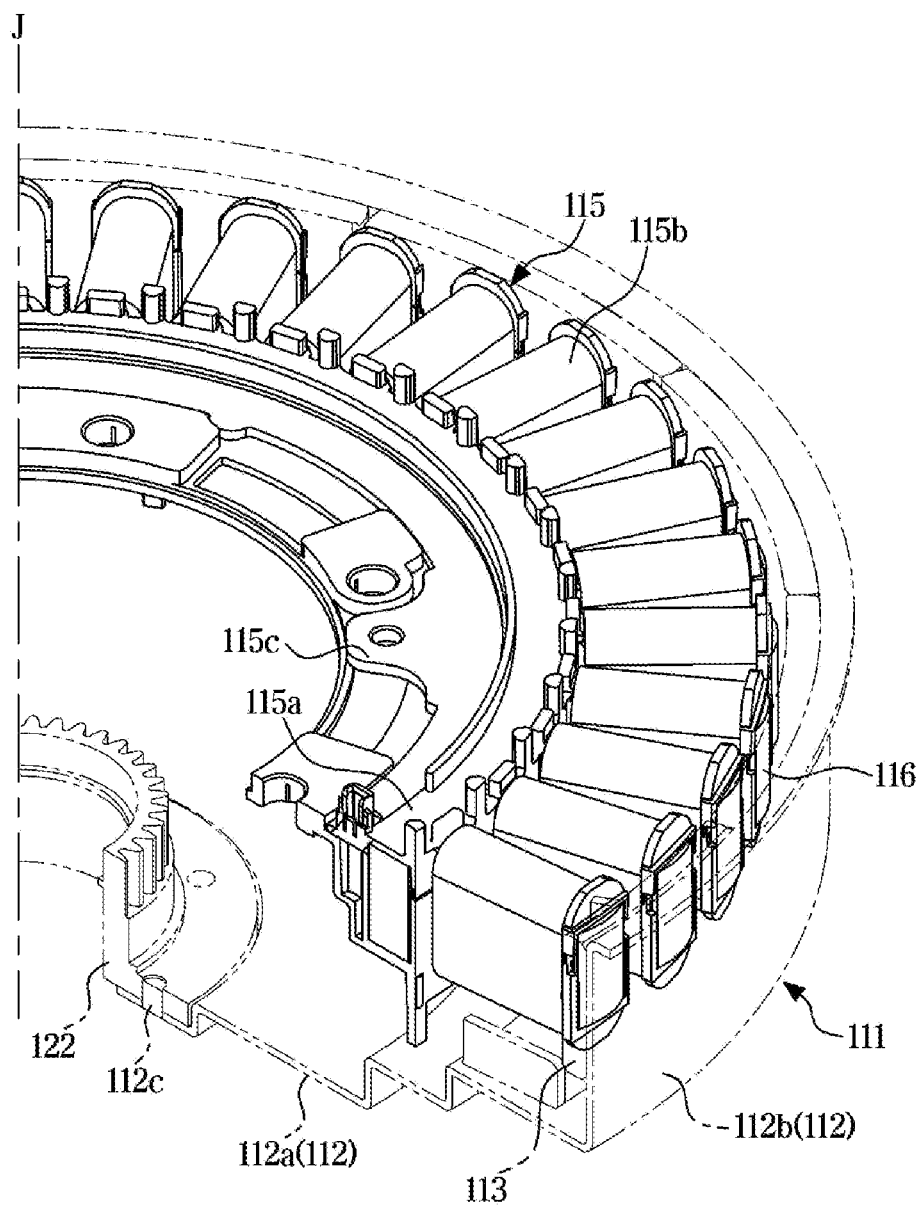
FIG. 5 is a schematic view partially illustrating a stator shown in FIG. 3.

FIG. 4 is a schematic view partially illustrating a drum shaft and a rotor shown in FIG. 3. FIG. 5 is a schematic view partially illustrating the stator shown in FIG. 3;

The motor 110 has a rotor 111 and a stator 115. The motor 110 is provided as a so-called outer rotor type motor in which the rotor 111 is located outside the stator 115.

Referring to FIG. 4, the rotor 111 may include a rotor case 112 and a plurality of magnets 113. The rotor case 112 includes a cylindrical member having a bottom and arranged such that the center thereof is aligned with the rotation axis J. The rotor case 112 includes a bottom wall 112*a* provided in a disk-shape and having a circular hole in the center thereof, and a peripheral wall 112*b* having a cylindrical shape and connected from a circumference of the bottom wall 112*a*. Here, the bottom wall 112*a* may be provided using a plurality of parts, or a single part. The rotor case 112 has a shallow bottom (a thin thickness), and the height of the peripheral wall 112*b* is smaller than the radius of the bottom wall 112*a*.

Each of the magnets 113 is formed of a rectangular permanent magnet bent in an arc shape. The magnets 113 are arranged in series in the circumferential direction and fixed to an inner surface of the peripheral wall 112*b* of the rotor case 112. The magnets 113 provide magnetic poles such that S poles are arranged side by side and N poles are arranged side by side in an alternating manner.

A sun gear 122 may be coupled to an approximately central portion of the bottom wall 112*a* of the rotor case 112. The sun gear 122 may be provided to face the peripheral wall 112*b* of the rotor case 112. The sun gear 122 may be coupled to the bottom wall 112*a* of the rotor case 112 by a fastening member 112*c*. The sun gear 122 may have a gear formed on the outer peripheral surface thereof.

Referring to FIG. 5, the stator 115 is formed of a circular annular member, and includes a core portion 115*a* having a circular annular shape and a plurality of teeth portions 115*b* radially outwardly protruding from the core portion 115*a*. The stator 115 may be fixed to the base 103 through a fixing flange portion 115*c* provided inside the core portion 115*a*. The stator 115 may be accommodated in the rotor case 112.

The core portion 115*a* and each of the teeth portions 115*b* are formed by covering the surface of a stator core 116, which is formed of magnetic metal material, with an insulator having an insulating property. In addition, although not shown, the teeth portions 115*b* are wound with conducting wires in a predetermined order so that a plurality of coils are formed. At the end of each of the teeth portions 115*b* positioned on the outer periphery of the stator 115, a part of the stator core 116 is exposed. The exposed part of the stator core 116 is diametrically opposed to the magnet 113 of the rotor 111 with a predetermined gap therebetween.

The plurality of coils forms a 3-phase coil group having of U, V and W phases. Each of the coil groups supplies alternating current as the controller 6 controls the inverter 10. Accordingly, a magnetic field is formed between each coil group and the magnets of the rotor 111. The magnetic force causes the rotor 111 to rotate about the rotation axis J.

Figure 6:
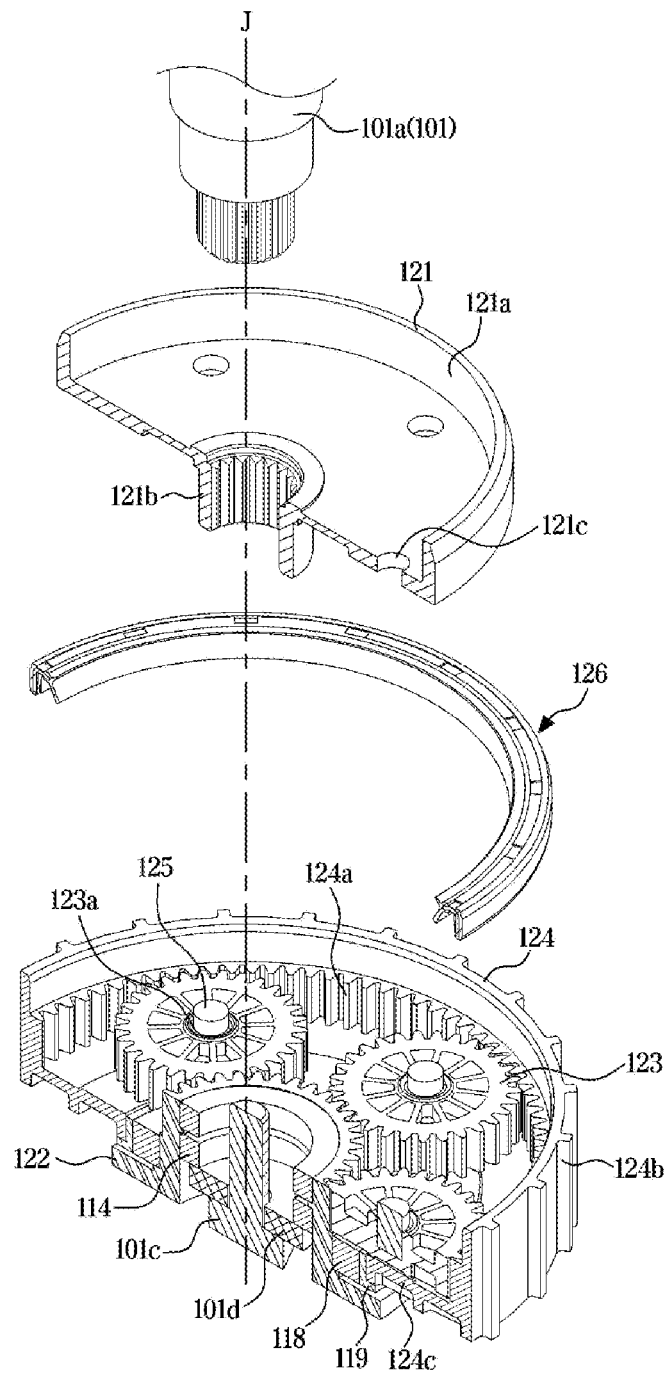
FIG. 6 is a schematic view illustrating a planetary gear assembly shown in FIG. 3.

FIG. 6 is a schematic view illustrating a planetary gear assembly shown in FIG. 3.

The planetary gear assembly 120 may connect the rotor 111 and the drum shaft 101 to rotate the drum shaft 101. The planetary gear assembly 120 is accommodated in the rotor case 112. The planetary gear assembly 120 is a speed reducer using a planetary gear device, and includes a carrier 121, a sun gear 122, a plurality of planetary gears 123 (four planetary gears in the embodiment shown in the drawing), and an internal gear 124.

The carrier 121 may include a base portion 121*a* provided in a cylindrical shape having a shallow bottom, and a shaft mounting portion 121*b* protruding from the central portion of the base portion 121*a* rearward in a cylindrical shape. A plurality of shaft support portions 121*c* are formed on the rear surface of the base portion 121*a*.

The shaft mounting portion 121*b* is provided at an inner circumferential surface thereof with a serration that is coupled to the rear end 101*a* of the drum shaft 101. With the rear end 101*a* of the drum shaft 101 inserted into the shaft mounting portion 121*b*, the carrier 121 may be non-rotatably fixed to the drum shaft 101. At a circumference of the shaft support portion 121*b*, the sun gear 122 is supported through a carrier bearing 114. The sun gear 122 may be rotated about the rotation axis J.

The carrier bearing 114 having a cylindrical shape is fixed to an inside of the sun gear 122. The sun gear 122 is slidably supported on the drum shaft 101 (specifically, on the carrier 121 fixed to the drum shaft 101) through the carrier bearing 114. Accordingly, the rotor case 112 is provided to be rotatable with respect to the drum shaft 101.

The internal gear 124 includes a substantially cylindrical member having a relatively larger diameter than the sun gear 122. The internal gear 124 is provided on the inner peripheral surface thereof with a gear portion 124*a*. The gear portion 124*a* has gear teeth formed along the entire circumference thereof. In addition, the internal gear 124 is provided on the outer peripheral surface thereof with a plurality of inner slide guides 124*b* that are formed as a bar shaped protrusions extending in the direction of the rotation axis and arranged along the entire circumference at regular intervals. The inner slide guide 124*b* will be separately described below.

The internal gear 124 is arranged at a circumference of the sun gear 122 on the rotation axis J. The internal gear 124 may have an upper inner side configured to come in contact with a sealing member 126 having a ring shape. The carrier 121 is rotatably supported on the internal gear 124 through the sealing member 126.

The internal gear 124 may include a cover portion 124*c* formed to cover at least a part of a lower side of the planetary gear 123. The cover portion 124*c* may extend from the gear portion 124*a* along the radial direction of the internal gear 124. Since the internal gear 124 includes the cover portion 124*c* to cover one surface of the planetary gear 123, the size of the motor 110 of the driving device 100 may be reduced. With the reduced size of the motor 110, a gap between the main body 2 of the washing machine 1 and the motor 110 may be secured when the driving device 100 is coupled to the rear of the tub 3, so that damage to the motor 110 due to the vibration of the tub 3 may be prevented.

The planetary gear 123 is rotatably supported on the carrier 121, and is disposed between the sun gear 122 and the internal gear 124 to be engaged with the sun gear 122 and the internal gear 124. The planetary gear 123 may be provided to transmit the rotary power of the sun gear 122 to the carrier 121.

One side of the planetary gear 123 in the direction of the rotation axis may be covered by the carrier 121, and the opposite side may be covered by the internal gear 124. In the planetary gear 123, at least a portion of one surface of the planetary gear 123 into which a planetary gear shaft 125 is inserted may be covered by the carrier 121. In the planetary gear 123, at least a portion of a surface opposite to the one surface, into which the planetary gear shaft 125 is inserted, may be covered by the internal gear 124. Specifically, the at least a portion of the surface of the planetary gear 123 opposite to the one surface, into which the planetary gear shaft 125 is inserted, may be covered by the cover portion 124c of the internal gear 124.

The planetary gear 123 includes a gear member having a relatively small diameter. A shaft insertion groove 123a is formed in a substantially central portion of each of the planetary gears 123. One end of the planetary gear shaft 125 inserted into the shaft insertion groove 123a may be supported by the shaft support portion 121c of the carrier 121. That is, the planetary gear shaft 125 may be rotatably coupled to one side of the planetary gear 123, and may be fixed to the carrier 121. On the outer peripheral surface of each of the planetary gears 123, gear teeth are formed along the entire circumference. The gear teeth are engaged with the sun gear 122 and the internal gear 124 on the opposite sides.

When the sun gear 122 rotates at a predetermined speed while the internal gear 124 is fixed (in a non-rotatable state), each of the planetary gears 123 rotates while turning around the sun gear 122. Accordingly, the carrier 121 and the drum shaft 101 rotate at a reduced speed.

Between the internal gear 124 and the sun gear 122, a bush bearing 118 and a sliding member 119 may be provided. The bush bearing 118 and the sliding member 119 may have a ring shape. As the bush bearing 118 and the sliding member 119 are provided between the internal gear 124 and the sun gear 122, the internal gear 124 may be provided to rotate relative to the sun gear 122.

The sealing member 126 may be provided to seal a gap between the internal gear 124 and the carrier 121. The sealing member 126 may be mounted in a space between the internal gear 124 and the carrier 121. The sealing member 126 may be provided to seal a space of the planetary gear assembly 120 in which the planetary gear 123 is disposed.

The internal gear 124, the sun gear 122, and the carrier 121 may form a space in which the planetary gears 123 are located. The bush bearing 118 and the sliding member 119 may be provided between the internal gear 124 and the sun gear 122. The carrier bearing 114 may be provided between the sun gear 122 and the carrier 121. The sealing member 126 may be provided between the internal gear 124 and the carrier 121. The internal gear 124, the sliding member 119, the bush bearing 118, the sun gear 122, the carrier bearing 114, the carrier 121, and the sealing member 126 may form a closed loop when taken along a direction of the rotation axis. The internal gear 124, the sliding member 119, the bush bearing 118, the sun gear 122, the carrier bearing 114, the carrier 121, and the sealing member 126 may form a sealed space in which the planetary gears 123 are located. The internal gear 124, the sliding member 119, the bush bearing 118, the sun gear 122, the carrier bearing 114, the carrier 121, and the sealing member 126 may provide a sealed space such that the space in which the planetary gears 123 are located is filled with an lubricating oil. When the planetary gear assembly 120 forms the sealed space, at least one of the carrier bearing 114, the bush bearing 118, or the sliding member 119 may be omitted.

Since the driving device 100 has the space, in which the planetary gears 123 are located, sealed and filled with lubricating oil, noise may be reduced.

Figure 7:
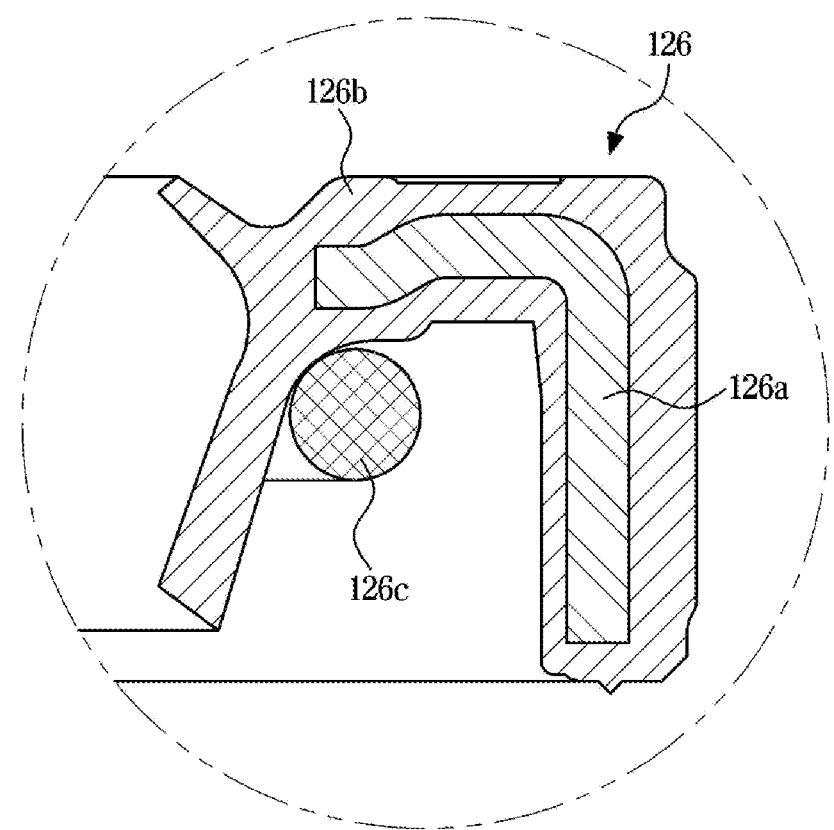
FIG. 7 is an enlarged view illustrating part A shown in FIG. 3.

FIG. 7 is an enlarged view illustrating part A shown in FIG. 3.

Referring to FIG. 7, the sealing member 126 may include a sealing body 126a, a sealing cover 126b, and an elastic body 126c.

The sealing body 126a may be formed of a material having a rigidity greater than that of the sealing cover 126b. The sealing body 126a may include steel. The sealing body 126a may be provided to prevent deformation of the sealing member 126. The sealing body 126a may have a substantially ring shape. The sealing body 126a may be located closer to the internal gear 124 than the elastic body 126c is.

The sealing cover 126b may be formed of a material more flexible than the sealing body 126a. The sealing cover 126b may include rubber. The sealing cover 126b may be formed to surround the sealing body 126a. The sealing cover 126b may have a substantially ring shape.

The elastic body 126c may be provided to apply an elastic force toward the carrier 121. The elastic body 126c may be provided such that the sealing member 126 may maintain sealing performance while the carrier 121 is rotating. The elastic body 126c may be provided such that at least a portion thereof facing the carrier 121 is covered by the sealing cover 126b. The elastic body 126c may include a spring. The elastic body 126c may have a substantially ring shape.

Figure 8:
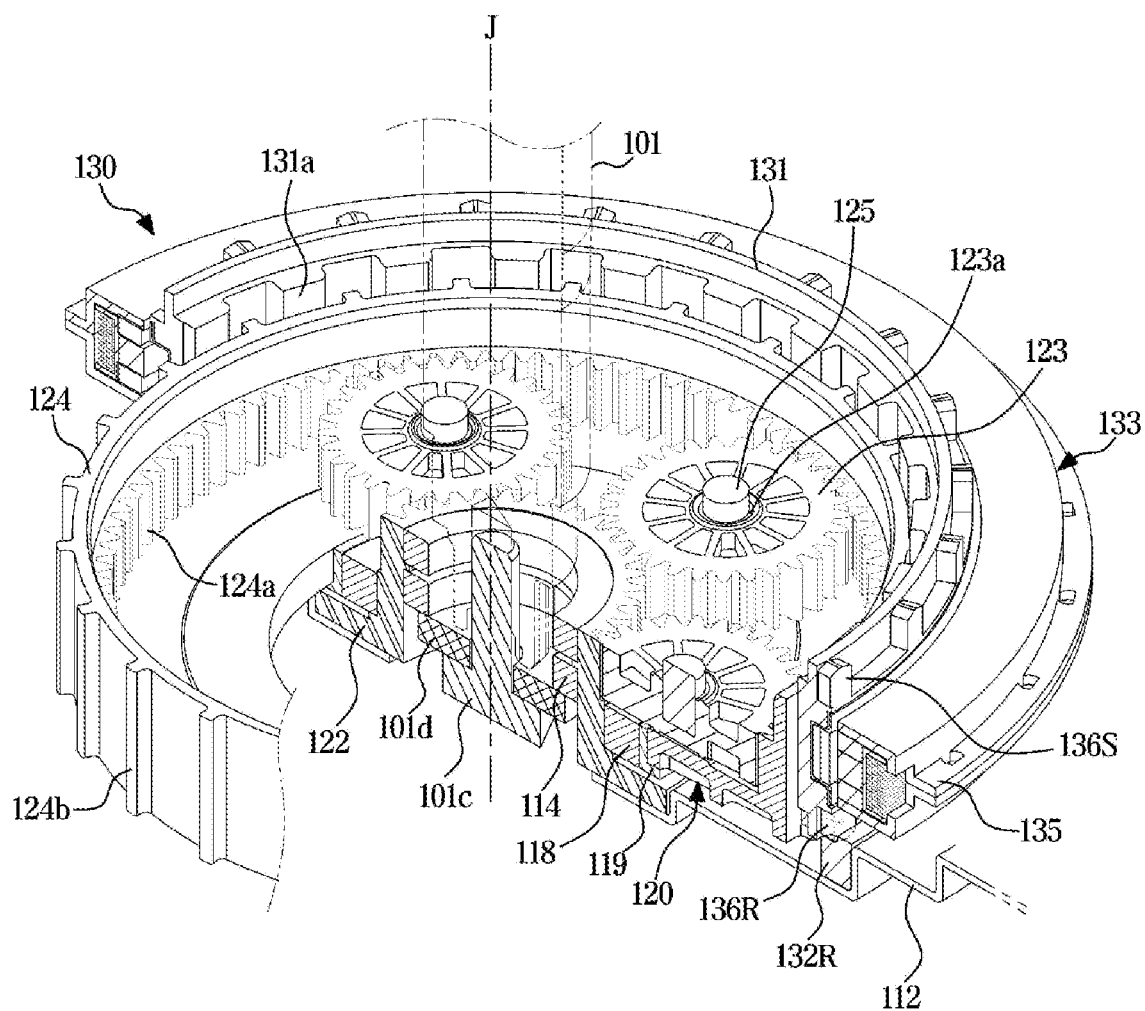
FIG. 8 is a schematic view partially illustrating a planetary gear assembly and a clutch shown in FIG. 3.
Figure 9:
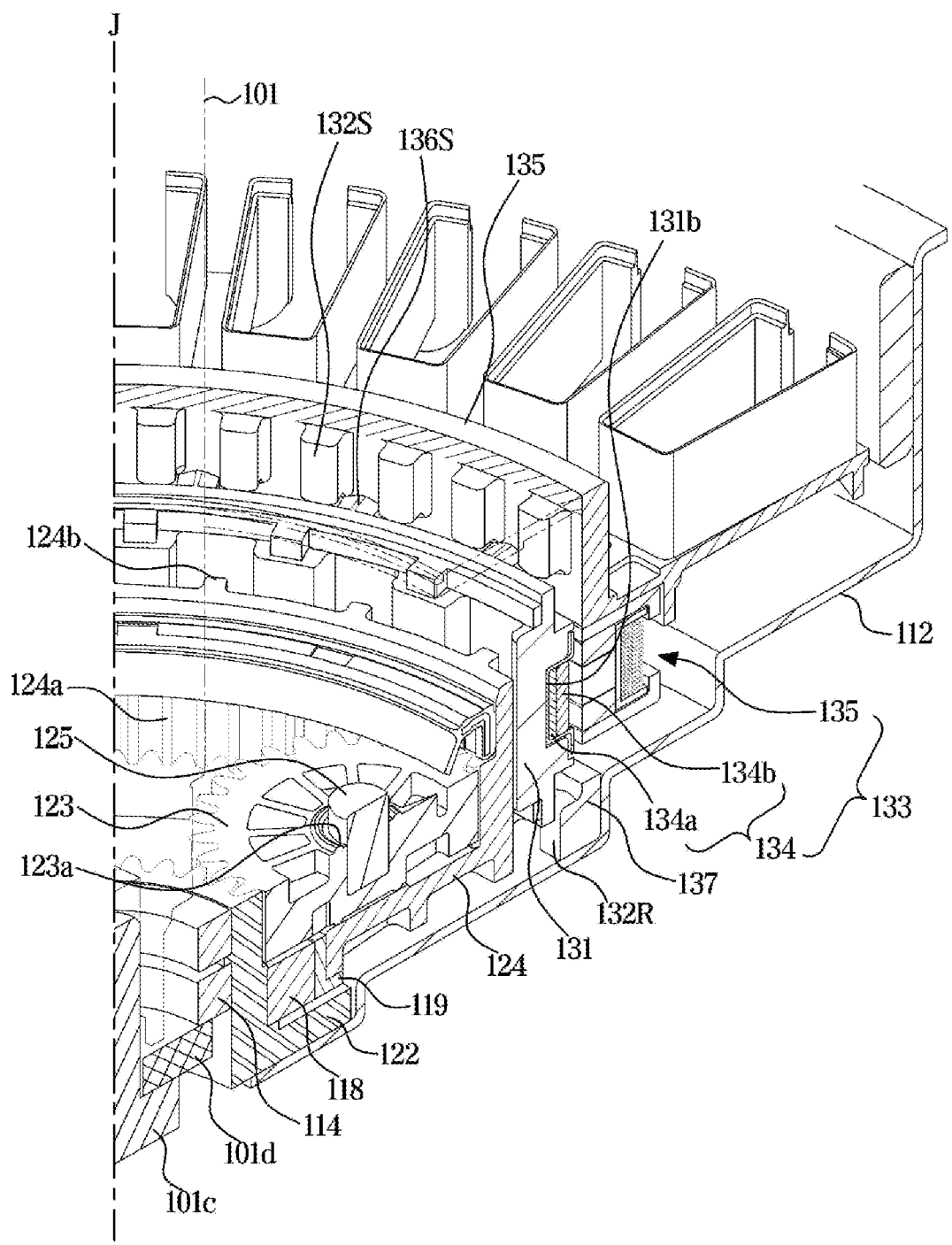
FIG. 9 is a schematic view illustrating main parts of the planetary gear assembly and the clutch shown in FIG. 3.
Figure 10:
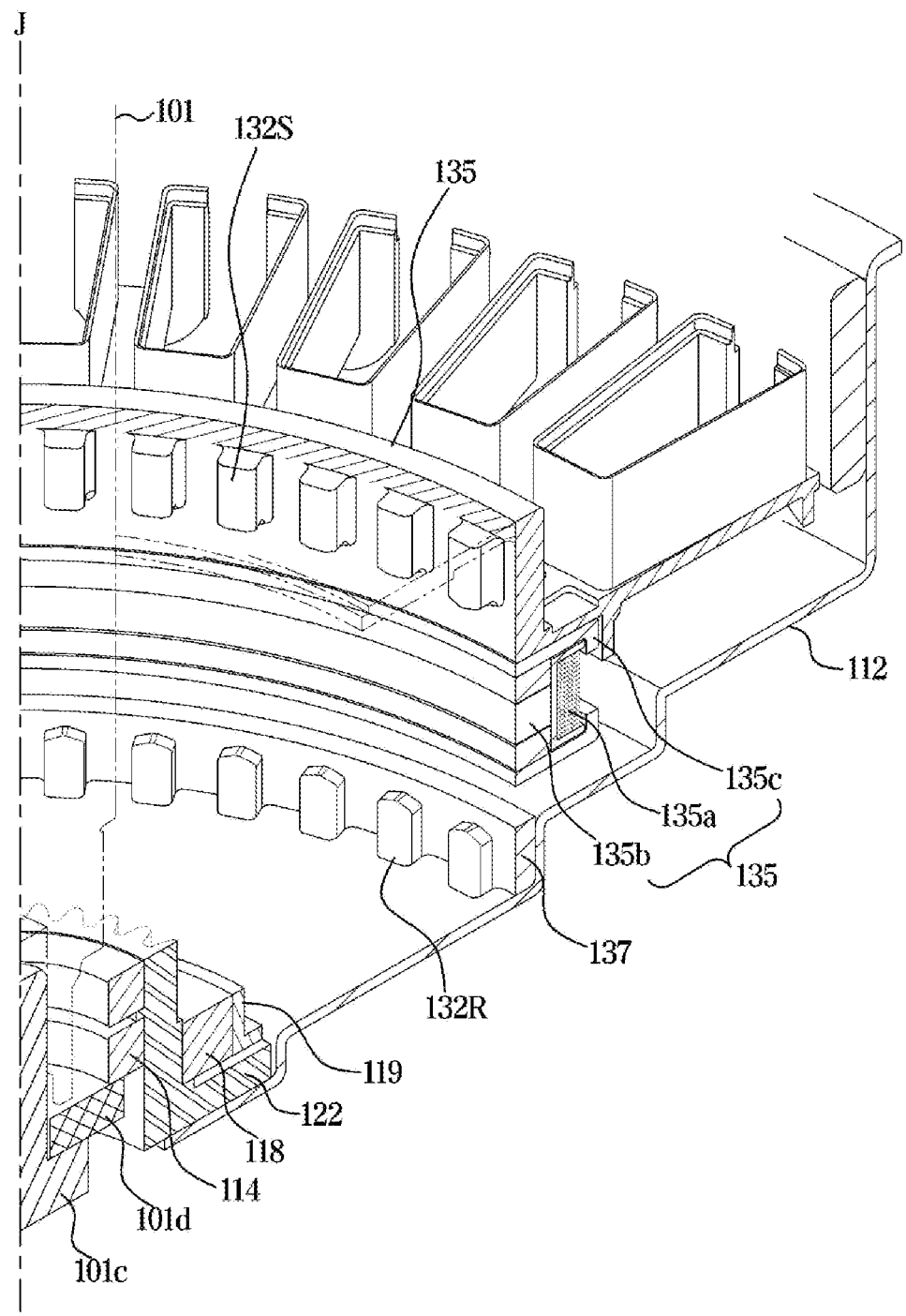
FIG. 10 is a schematic view illustrating main parts of the planetary gear assembly and the clutch shown in FIG. 3.
Figure 11:
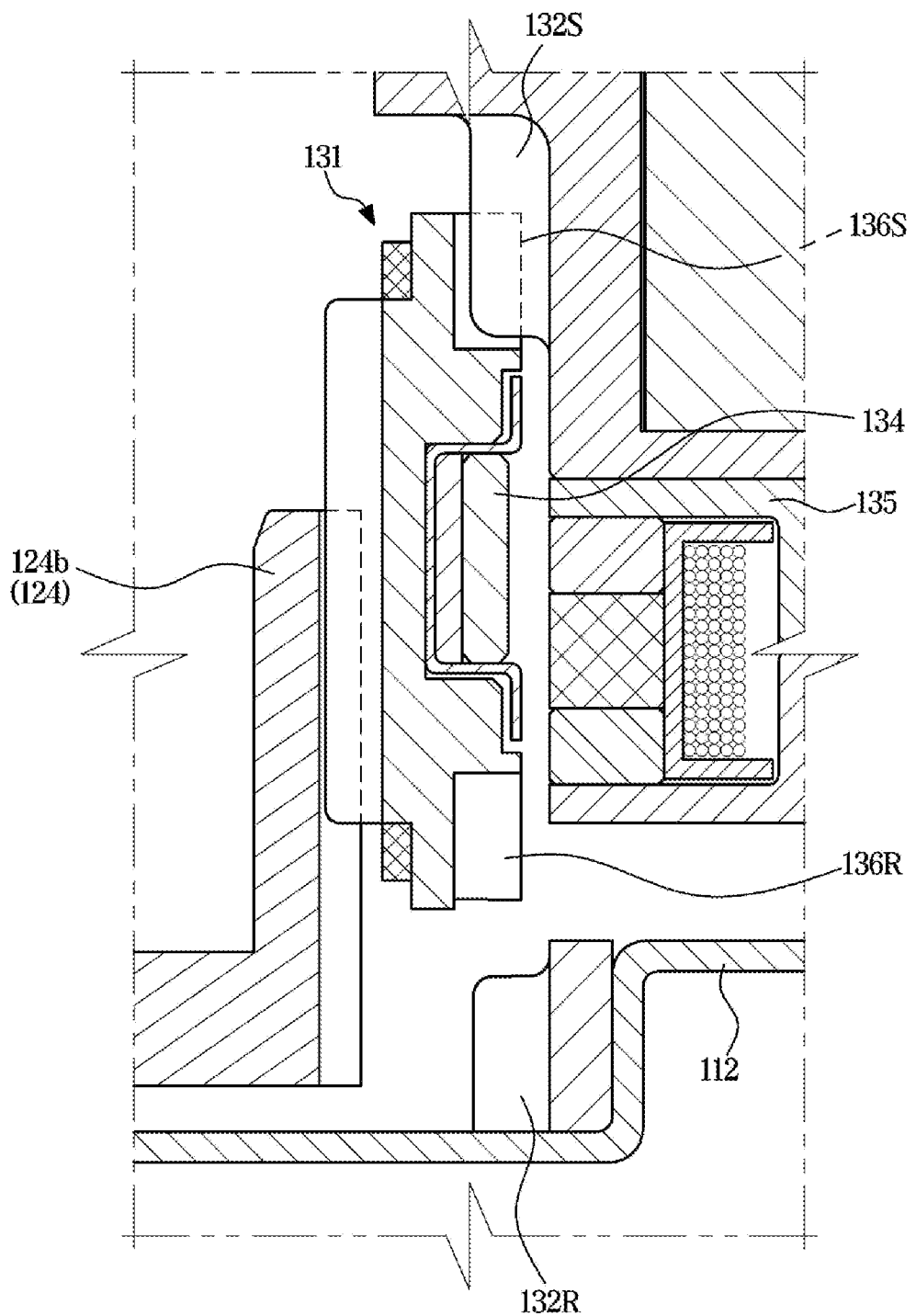
FIG. 11 is a view illustrating a state in which the clutch shown in FIG. 3 is in a first mode.
Figure 12:
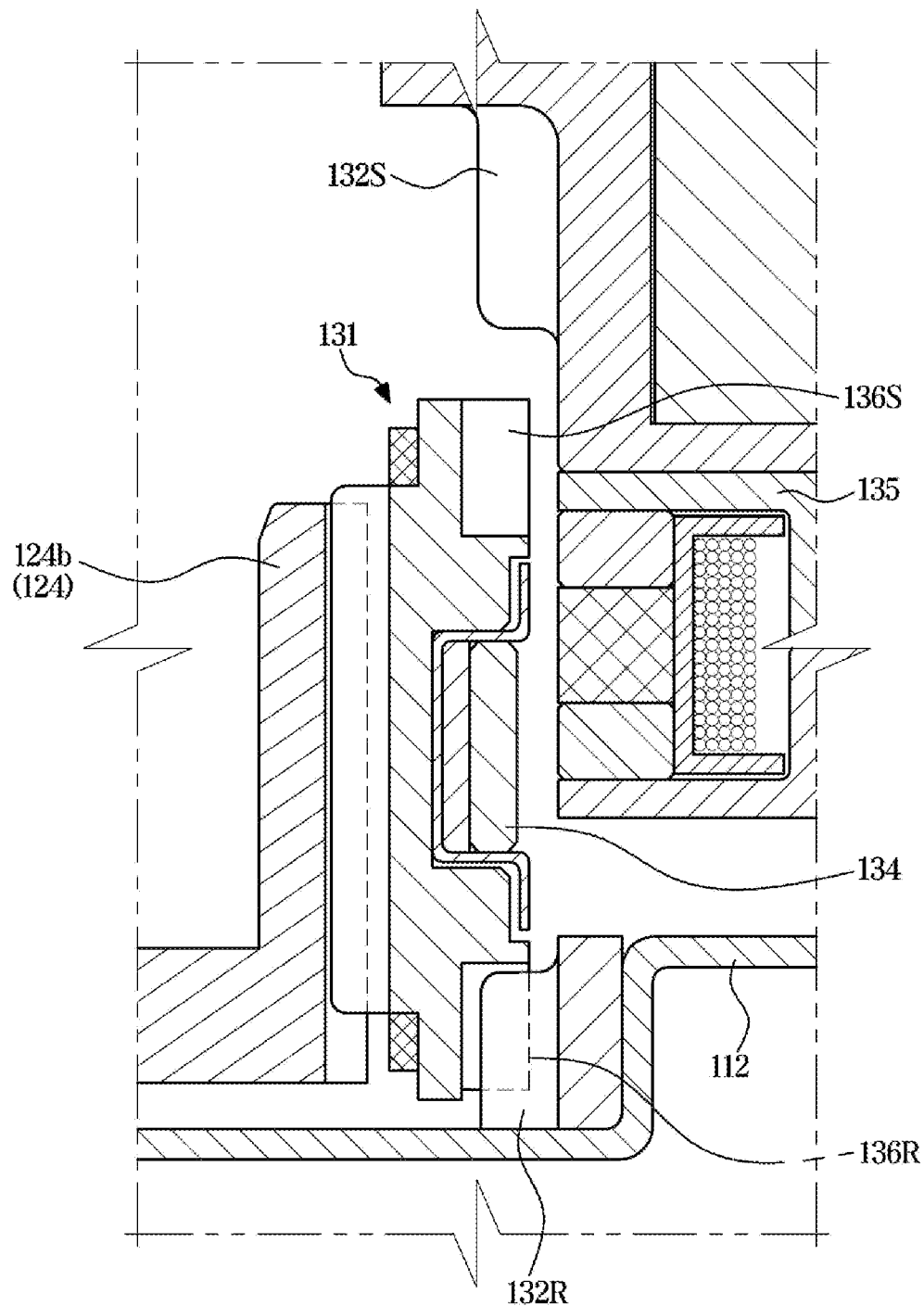
FIG. 12 is a view illustrating a state in which the clutch shown in FIG. 3 is in a second mode.

FIG. 8 is a schematic view partially illustrating a planetary gear assembly and a clutch shown in FIG. 3. FIG. 9 is a schematic view illustrating main parts of the planetary gear assembly and the clutch shown in FIG. 3. FIG. 10 is a schematic view illustrating main parts of the planetary gear assembly and the clutch shown in FIG. 3. FIG. 11 is a view illustrating a state in which the clutch shown in FIG. 3 is in a first mode. FIG. 12 is a view illustrating a state in which the clutch shown in FIG. 3 is in a second mode;

Referring to FIGS. 8 to 10, the clutch 130 is disposed at a circumference of the planetary gear assembly 120. The clutch 130 is accommodated in the rotor case 112. The clutch 130 includes a slider 131 (a movable part), locking protrusions 132R and 132S (fixed parts) on a rotor side and a stator side, and a clutch driver 133 (an actuator). The clutch driver 133 has a movable member 134 and a fixed member 135.

The slider 131 includes a cylindrical member having a diameter larger than that of the internal gear 124. On the inner circumferential surface of the slider 131, outer slide guides 131a having a bar shaped protrusion extending in the direction of the rotation axis are formed along the entire circumference at regular intervals. The outer slide guides 131a are configured to be engaged with the inner slide guides 124b formed on the outer peripheral surface of the internal gear 124.

The slider 131 is arranged at the circumference of the internal gear 124 with the outer slide guides 131a respectively engaged with the inner slide guides 124b of the internal gear 124. Accordingly, the slider 131 is slidable in the direction of the rotation axis.

The slider 131 is provided on the outer circumferential surface thereof with a pair of hooking protrusions 136R and 136S, which includes a hooking protrusion on the rotor side and a hooking protrusion on the stator side. The hooking protrusions 136R and 136S include a plurality of protrusions (movable-side protrusions) protruding in the direction of the rotation axis, and are formed along the entire circumference at regular intervals on the outer circumferential surface of the slider 131. The hooking protrusion 136R on the rotor side is disposed at a lower end portion of the slider 131 while protrudes downward. The hooking protrusion 136 on the stator side is disposed at an upper end portion of the slider 131 while protruding upward.

On the outer circumferential surface of the slider 131, a movable member accommodating portion 131b for accommodating the movable member 134 is formed between the hooking protrusion 136R on the rotor side and the hooking protrusion 136S on the stator side.

The locking protrusion 132R (a first fixing portion) on the rotor side is provided on an annular member 137 mounted on the rotor case 112. The locking protrusions 132R on the rotor side are provided as a plurality of protrusions (fixing-side protrusions) protruding in the direction of the rotation axis while being spaced apart at regular intervals along the entire circumference. The protrusions protrude upwards. In addition, although not shown, the protrusions may be formed simultaneously with other components when integrally formed on the rotor side or may be integrally formed with the rotor case 112.

The locking protrusion 132S (a second fixing portion) on the stator side is provided on an annular member 135 of the stator 115. The locking protrusions 132S on the stator side are provided as a plurality of protrusions (fixing-side protrusions) protruding in the direction of the rotation axis while being spaced apart from each other at regular intervals along the entire circumference. The protrusions protrude downward. In addition, the protrusions may be integrally formed with the insulator.

The locking protrusion 132R on the rotor side and the locking protrusion 132S on the stator side are spaced apart from each other in the direction of the rotation axis to face each other. The locking protrusion 132R on the rotor side is configured to be engaged with the hooking protrusion 136R on the rotor side, and the locking protrusion 132S on the stator side is configured to be engaged with the hooking protrusion 136S on the stator side.

The interval between the locking protrusion 132R on the rotor side and the locking protrusion 132S on the stator side is set to be larger than the interval between the hooking protrusion 136R on the rotor side and the hooking protrusion 136S on the stator side. Therefore, when the locking protrusion 132R on the rotor side is engaged with the hooking protrusion 136R on the rotor side, the locking protrusion 132S on the stator side is not engaged with the hooking protrusion 136S on the stator side. When the locking protrusion 132S on the stator side is engaged with the hooking protrusion 136S on the stator side, the locking protrusion 132R on the rotor side is not engaged with the hooking protrusion 136R on the rotor side.

The movable member 134 of the clutch driver 133 has a slider core 134a and a clutch magnet 134b, and is installed in the movable member accommodating portion 131b.

The slider core 134a includes a cylindrical metal member having a magnetic property, and is installed inside the movable member accommodating portion 131b. The clutch magnet 134b includes a permanent magnet. The clutch magnets 134b are installed along the entire circumference of the movable member accommodating portion 131b while in contact with the surface of the slider core 134a.

The immovable member 135 of the clutch driver 133 includes a clutch coil 135a, a coil holder 135b, a holder support 135c, and the like. The coil holder 135b is provided as a ring-shaped member having a substantially C-shaped cross section, in which the opening faces in the radial outward direction, and having an insulating property. The clutch coil 135a is formed by winding an electric wire around the coil holder 135b.

The holder support 135c is provided as a pair of upper and lower annular members in which the coil holder 135b is inserted therebetween. The holder support 135c is fixed to the stator 115. Accordingly, the clutch coil 135a (the immovable member 135) is configured to face the clutch magnet 134b (the movable member 134) with a slight gap in the radial direction.

Electric conduction to the clutch coil 135a is controlled by the controller 6. By electric conduction to the clutch coil 135a, a magnetic field is formed between the clutch coil 135a and the clutch magnet 134b. Accordingly, the slider 131 slides to one of both sides of the rotation axis direction.

Accordingly, as shown in FIGS. 11 and 12, a switching occurs between a first mode in which the hooking protrusion 136S on the stator side is engaged with the locking protrusion 132S on the stator side and a second mode in which the hooking protrusion 136R on the rotor side is engaged with the locking protrusion 132R on the rotor side.

In the first mode, the internal gear 124 is supported on the stator 115 through the slider 131. Accordingly, the rotation of the rotor 111 and the sun gear 122 is transmitted to the drum shaft 101 and the carrier 121 through the planetary gear assembly 120. Accordingly, the driving device 100 outputs a high torque rotary power at a low speed rotation.

Meanwhile, in the second mode, the internal gear 124 is supported on the rotor 111 through the slider 131. Accordingly, the rotation of the rotor 111 and the sun gear 122 is transmitted to the drum shaft 101 and the carrier 121 without passing through the planetary gear assembly 120.

That is, since the rotor 111, the sun gear 122, and the internal gear 124 rotate as one structure, the planetary gears 123 do not rotate. Accordingly, the drum shaft 101 and the carrier 121 also rotate together with the rotor 111, the sun gear 122, and the internal gear 124 as one structure. Accordingly, the driving device 100 outputs a low torque rotary power at a high speed rotation.

As described above, the driving device 100 has the motor 110 in which the planetary gear assembly 120 and the clutch 130 are efficiently integrated such that the motor 110, the planetary gear assembly 120, and the clutch 130 are aligned in a direction approximately perpendicular to the rotation axis J. Accordingly, a high torque rotary power at a low speed rotation and a low torque rotary power at a high speed rotation may be output through a single drum shaft 101 based on switching of the clutch 130. In addition, since the rotation speeds and torque values of the motor 110 may be set to relatively close to each other even in the two modes, that is, the first mode and the second mode having different outputs, the motor efficiency may be optimized.

Accordingly, the driving device 100 may output a rotary power suitable for the washing machine with a compact size. The driving device 100 is suitable for a washing machine.

Figure 13:
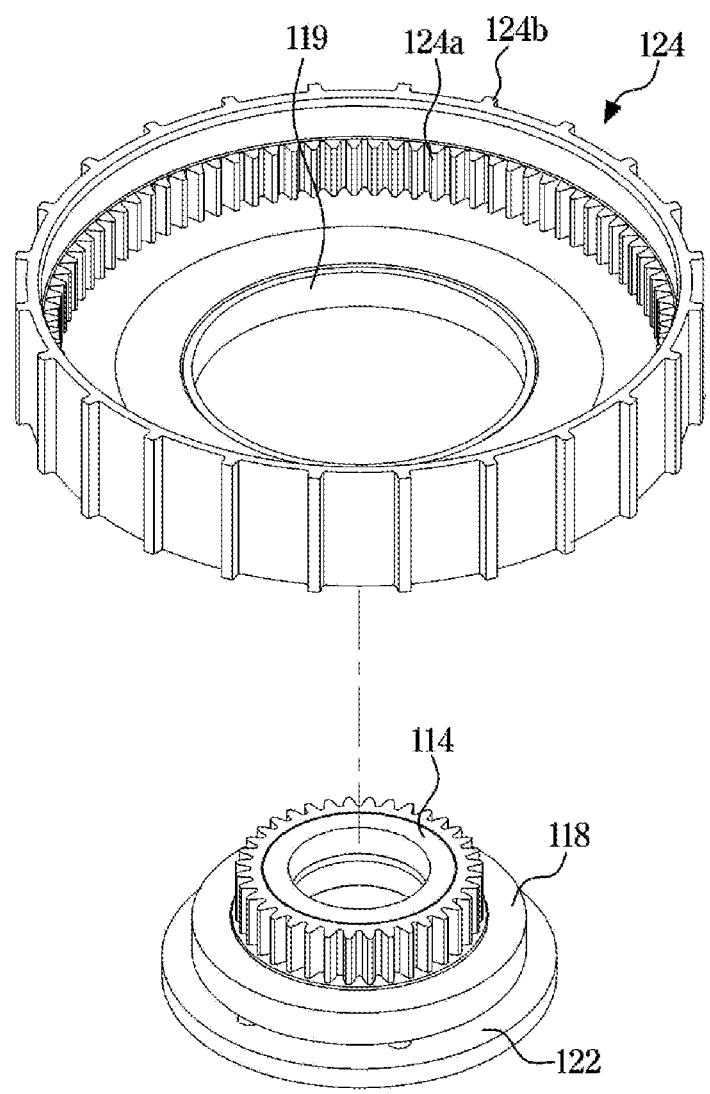
FIG. 13 is a view illustrating a process of a sun gear and an internal gear shown in FIG. 3 being mounted.
Figure 14:
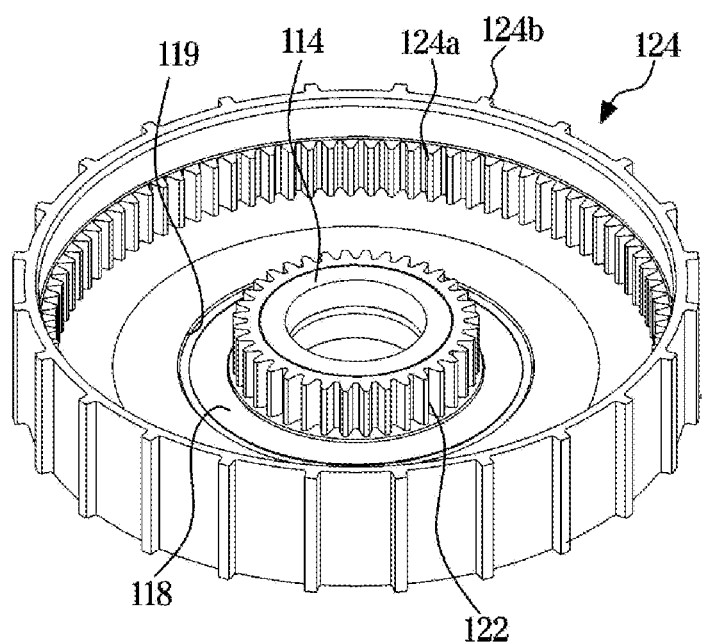
FIG. 14 is a view illustrating a state in which the sun gear shown in FIG. 13 is mounted to the internal gear.
Figure 15:
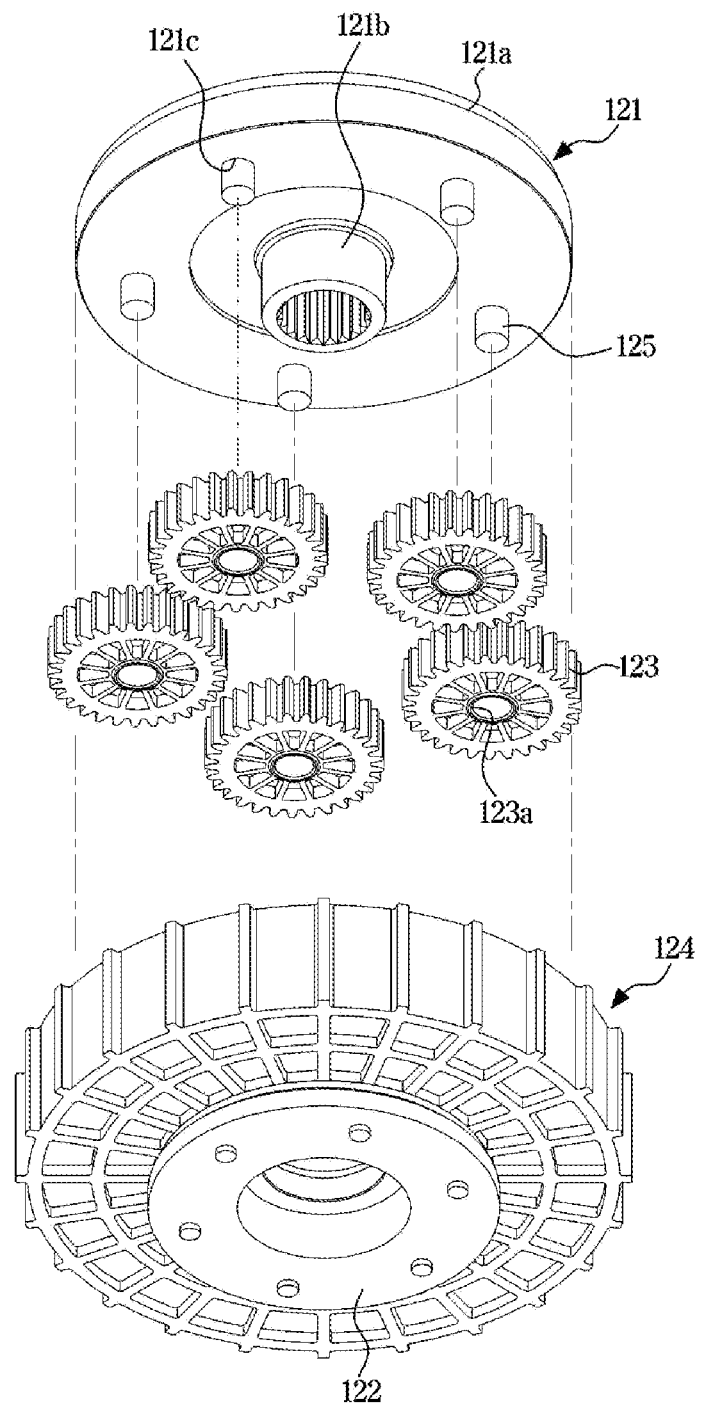
FIG. 15 is a view illustrating a process of a carrier and a planetary gear being mounted to the sun gear and the internal gear shown in FIG. 14.
Figure 16:
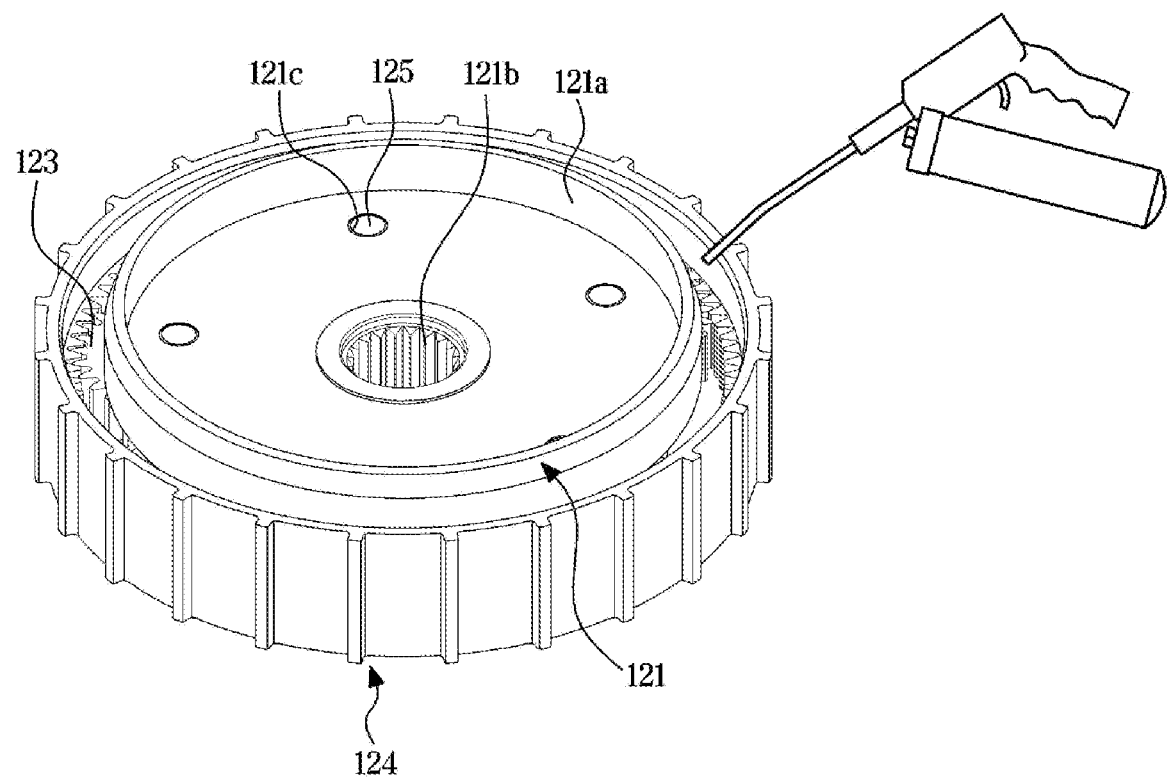
FIG. 16 is a view illustrating a process of lubricant being injected into a space in which the planetary gear shown in FIG. 15 is located.
Figure 17:
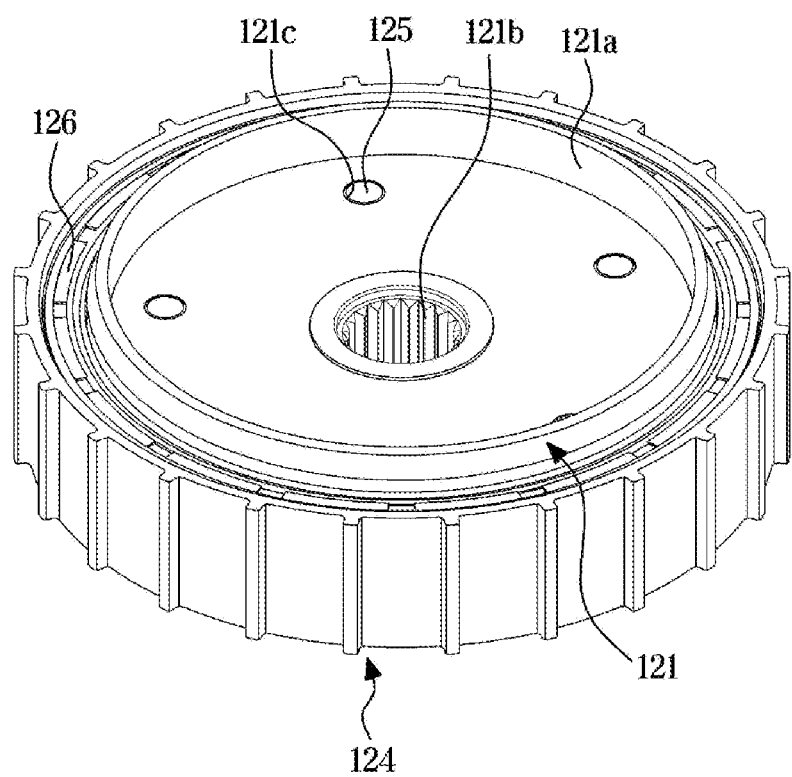
FIG. 17 is a view illustrating a state in which a sealing member is mounted in a gap between the internal gear and the carrier shown in FIG. 16.

FIG. 13 is a view illustrating a process of a sun gear and an internal gear shown in FIG. 3 being mounted. FIG. 14 is a view illustrating a state in which the sun gear shown in FIG. 13 is mounted to the internal gear. FIG. 15 is a view illustrating a process of a carrier and a planetary gear being mounted to the sun gear and the internal gear shown in FIG. 14. FIG. 16 is a view illustrating a process of lubricant being injected into a space in which the planetary gear shown in FIG. 15 is located. FIG. 17 is a view illustrating a state in which a sealing member is mounted in a gap between the internal gear and the carrier shown in FIG. 16.

An assembly process of the planetary gear assembly 120 is described with reference to FIGS. 13 to 17.

Referring to FIG. 13, the carrier bearing 114 may be mounted inside the sun gear 122. The bush bearing 118 may be mounted outside the sun gear 122. The sliding member 119 may be mounted inside the internal gear 124.

Referring to FIG. 14, the sun gear 122 to which the carrier bearing 114 and the bush bearing 118 are mounted may be mounted to the internal gear 124 to which the sliding member 119 is mounted. The sun gear 122 and the internal gear 124 may be coupled to each other such that the bush bearing 118 is inserted into the sliding member 119.

Referring to FIG. 15, the carrier 121 and the planetary gear 123 may be mounted on the sun gear 122 coupled to the internal gear 124. The planetary gear 123 may be rotatably coupled to the planetary gear shaft 125 inserted into the carrier 121. The carrier 121 coupled to the planetary gear 123 may be mounted on the sun gear 122 such that the shaft mounting portion 121b is inserted into the carrier bearing 114.

Referring to FIG. 16, in a state in which the carrier 121, the sun gear 122, the planetary gear 123, and the internal gear 124 are mounted, the space in which the planetary gears 123 are located may be filled with lubricant. The lubricant may include grease.

Referring to FIG. 17, after the space in which the planetary gears 123 are located is filled with lubricant, the sealing member 126 may be mounted between the carrier 121 and the internal gear 124. The sealing member 126 may seal a gap between the carrier 121 and the internal gear 124.

Although specific embodiments thereof are shown by way of example in the accompanying drawings and will be described, it should be understood that there is no intention to limit the disclosure to the particular embodiments disclosed, and it would be appreciated by those skilled in the art that changes and modifications may be made in these embodiments without departing from the principles and scope of the disclosure, the scope of which is defined in the claims and their equivalents.

What is claimed is:

1. A washing machine comprising:
   a main body;
   a tub provided inside the main body;
   a drum inside the tub; and
   a driving device configured to rotate the drum,
   the driving device including:
      a drum shaft connected to the drum;
      a motor including a stator and a rotor rotatable through interaction with the stator; and
      a planetary gear assembly connecting the rotor to the drum shaft to rotate the drum shaft, the planetary gear assembly including:
         a sun gear connected to the rotor;
         a carrier connected to the drum shaft;
         a planetary gear to transmit a rotary power of the sun gear to the carrier;
         an internal gear engaged with the planetary gear; and
         a sealing member configured to seal a gap between the carrier and the internal gear, the sealing member comprising:
            a sealing body; and
            a sealing cover fully enclosing the sealing body therein, and made of a material home flexible than a material made of the sealing body.

2. The washing machine of claim 1, wherein the planetary gear assembly includes
   a sealed space formed in which the planetary gear is located and to be filled with a lubricating oil therein.

3. The washing machine of claim 1, wherein
   the sealing body includes steel; and
   the sealing cover includes rubber.

4. The washing machine of claim 1, wherein the sealing cover further comprises:
   a first portion enclosing the sealing body therein and disposed adjacent to the internal gear in the gap;
   a second portion extended from the first portion toward the carrier and adjacent to the internal gear in the gap; and
   wherein the sealing member further includes an elastic body disposed adjacent to the second portion of the sealing cover to apply an elastic force toward the carrier.

5. The washing machine of claim 4, wherein the sealing cover is formed to cover a portion of the elastic body that faces the carrier.

6. The washing machine of claim 4, wherein the sealing body is located closer to the internal gear than the elastic body is to the internal gear.

7. The washing machine of claim 1, wherein the planetary gear is to have one side covered by the carrier and an other side, opposite to the one side, covered by the internal gear.

8. The washing machine of claim 7, wherein the planetary gear assembly further includes a planetary gear shaft rotatably coupled to the one side of the planetary gear and fixed to the carrier.

9. The washing machine of claim 7, wherein the internal gear has a gear portion engaged with the planetary gear and a cover portion covering the other side of the planetary gear.

10. The washing machine of claim 1, wherein the planetary gear assembly further includes:
    a bush bearing and a sliding member, both the bush bearing and the sliding member are located between the sun gear and the internal gear; and
    a carrier bearing between the sun gear and the carrier.

11. The washing machine of claim 10, wherein the internal gear, the sealing member, the carrier, the carrier bearing, the sun gear, the bush bearing, and the sliding member form a closed loop in a cross section of the planetary gear assembly taken along a direction of a rotation axis of the planetary gear.

12. The washing machine of claim 1, wherein the sun gear is fixed to the rotor by a fastening member.

13. The washing machine of claim 1, wherein the rotor includes a rotor case and a plurality of magnets, and
    the plurality of magnets is facing an outer periphery of the stator.

14. The washing machine of claim 1, wherein the driving device is mounted on the tub to form a gap between the driving device and the tub.

15. A clothes treating apparatus comprising:
    a main body;
    a drum inside the main body; and
    a driving device configured to rotate the drum, the driving device including:
       a drum shaft connected to the drum;
       a motor including a stator and a rotor rotatable through interaction with the stator; and
       a planetary gear assembly connecting the rotor to the drum shaft to rotate the drum shaft,
       the planetary gear assembly including:
          a sun gear connected to the rotor;

a carrier connected to the drum shaft;
a planetary gear to transmit a rotary power of the sun gear to the carrier; and
an internal gear engaged with the planetary gear, and wherein the planetary gear assembly comprising:
a space, formed therein, in which the planetary gear is located, sealed and to be filled with a lubricating oil; and
a sealing member configured to seal a gap between the internal gear and the carrier to seal the space in which the planetary gears are located, the sealing member comprising:
a sealing body; and
a sealing cover fully enclosing the sealing body therein, and formed of a material more flexible than a material formed of the sealing.

16. The clothes treating apparatus of claim 15, wherein the planetary gear assembly comprises a sealing member configured to seal a gap between the internal gear and the carrier to seal the space in which the planetary gears are located.

17. The clothes treating apparatus of claim 15, wherein the sealing cover further comprises:

a first portion enclosing the sealing body therein and disposed adjacent to the internal gear in the gap;
a second portion extended from the first portion toward the carrier and adjacent to the internal gear in the gap; and
wherein the sealing member further comprises:
an elastic body disposed adjacent to the second portion of the sealing cover to apply an elastic force toward the carrier.

18. The clothes treating apparatus of claim 17, wherein the sealing cover is formed to cover a portion of the elastic body facing the carrier, and the sealing body is located closer to the internal gear than the elastic body is to the internal gear.

19. The clothes treating apparatus of claim 15, wherein the planetary gear assembly further comprises a planetary gear shaft rotatably coupled to one side of the planetary gear and fixed to the carrier.

20. The clothes treating apparatus of claim 15, wherein the internal gear comprises a gear portion engaged with the planetary gear, and a cover portion covering an other side opposite to the one side of the planetary gear.

* * * * *